(12) United States Patent
Michaels et al.

(10) Patent No.: US 7,257,939 B2
(45) Date of Patent: Aug. 21, 2007

(54) SLIDING-ACTION MAGNETO-MECHANICAL INJECTOR THROTTLING DEVICE

(75) Inventors: Robert S. Michaels, Scottsboro, AL (US); Jerrold H. Arszman, Huntsville, AL (US)

(73) Assignee: United States of America as represented by the Secretary of the Army, Washington, DC (US)

(*) Notice: Subject to any disclaimer, the term of this patent is extended or adjusted under 35 U.S.C. 154(b) by 623 days.

(21) Appl. No.: 10/640,842

(22) Filed: Aug. 15, 2003

(65) Prior Publication Data

US 2005/0034448 A1  Feb. 17, 2005

(51) Int. Cl.
*F02C 7/057* (2006.01)
*F02C 9/00* (2006.01)
*F02K 9/72* (2006.01)

(52) U.S. Cl. .................. 60/258; 60/240; 60/39.23; 60/39.27

(58) Field of Classification Search .............. 60/240, 60/39.27, 39.23, 257, 258
See application file for complete search history.

(56) References Cited

U.S. PATENT DOCUMENTS

| | | | | |
|---|---|---|---|---|
| 3,640,072 A | * | 2/1972 | Kayser ..................... | 60/258 |
| 5,265,415 A | * | 11/1993 | Cox, Jr. .................... | 60/258 |
| 5,622,046 A | | 4/1997 | Michaels et al. ......... | 60/258 |
| 6,370,867 B1 | * | 4/2002 | Schnoor .................... | 60/258 |
| 6,860,099 B1 | * | 3/2005 | Xenofos et al. .......... | 60/258 |

* cited by examiner

*Primary Examiner*—Charles G. Freay
(74) *Attorney, Agent, or Firm*—Hay Kyung Chang

(57) ABSTRACT

Sliding-Action Magneto-Mechanical Injector Throttling Device (SLAMMIT) provides on-demand, yet accurate, throttling of the mass flow of the fuel and/or oxidizer into the combustion chamber of a vortex injector. At least two SLAMMIT sub-assemblies comprise the SLAMMIT Device and each sub-assembly is integrated into a manifold and is driven to slide in a given direction by a drive block that is internal to the sub-assembly. The drive block is, in turn, actuated by an electromagnet that is external to the SLAMMIT sub-assembly. As the SLAMMIT sub-assemblies slide, flappers inside the sub-assemblies achieve the effective opening size of the injection orifices anywhere between fully open and fully closed.

18 Claims, 6 Drawing Sheets

SLIDING-ACTION MAGNETO-MECHANICAL INJECTOR THROTTLING DEVICE

DEDICATORY CLAUSE

The invention described herein may be manufactured, used and licensed by or for the Government for governmental purposes without the payment to us of any royalties thereon.

BACKGROUND OF THE INVENTION

In a typical vortex injector used in conjunction with an engine in whose combustion chamber hypergolic ignition occurs, mass flow control is accomplished in one of two ways. One approach is to utilize throttling valves that are positioned outside of the fuel supply manifold such that the flow is regulated at a place other than the entrance to the injection orifices. This approach is simple to implement but high throttling ratios (maximum mass flow-rate divided by minimum mass flow-rate) cannot be achieved via this approach without significant losses in engine performance. The losses occur because the minimum allowed pressure drop across the injection orifices is not maintained at the entrance to the orifices. The only way to overcome these losses is to employ a configuration that closely couples the throttling mechanism to the injection orifices.

The second approach to maintaining mass flow control does employ close coupling of the throttling mechanism to the injection orifices. However, this approach requires a breaching of the fuel manifold and using either an electrical or pneumatic actuator to drive the throttling mechanism via a mechanical link that passes through the breach. A significant disadvantage of this method is the requirement for a robust sealing system at the manifold-to-mechanical link interface, giving rise to reliability issues.

SUMMARY OF THE INVENTION

Sliding-Action Magneto-Mechanical Injector Throttling Device (SLAMMIT) provides on-demand throttling of the mass flow of the fuel and/or oxidizer into the combustion chamber of a vortex injector while overcoming the difficulties associated with the two approaches described above. At least two SLAMMIT sub-assemblies comprise the SLAMMIT Device and each sub-assembly is integrated into a manifold (either for fuel or oxidizer, for example) and is driven to slide in a given direction by a drive block that is internal to the sub-assembly. The drive block is, in turn, actuated by an electromagnet that is external to the SLAMMIT sub-assembly. Because the actuating force is electromagnetic (thus requiring no physical connection between the actuator and the drive block), even though the block is located inside the manifold and the actuator is outside the manifold, there is no need or concern for a robust sealing system between them.

As the SLAMMIT sub-assemblies slide, flappers inside the sub-assemblies achieve the effective opening size of the injection orifices anywhere between fully open and fully closed, both of the maximum positions inclusive. The flappers match in number the injection orifices that are located on the injector's body and each flapper is of a shape and size to cover its corresponding orifice completely. In the SLAMMIT Device, the differential pressures between the manifolds and the combustion chamber are used to effect a secure seal that prevents fuel flow and oxidizer flow into the chamber when the Device is positioned in the fully-closed position.

DESCRIPTION OF THE PREFERRED EMBODIMENT

Figure 1:
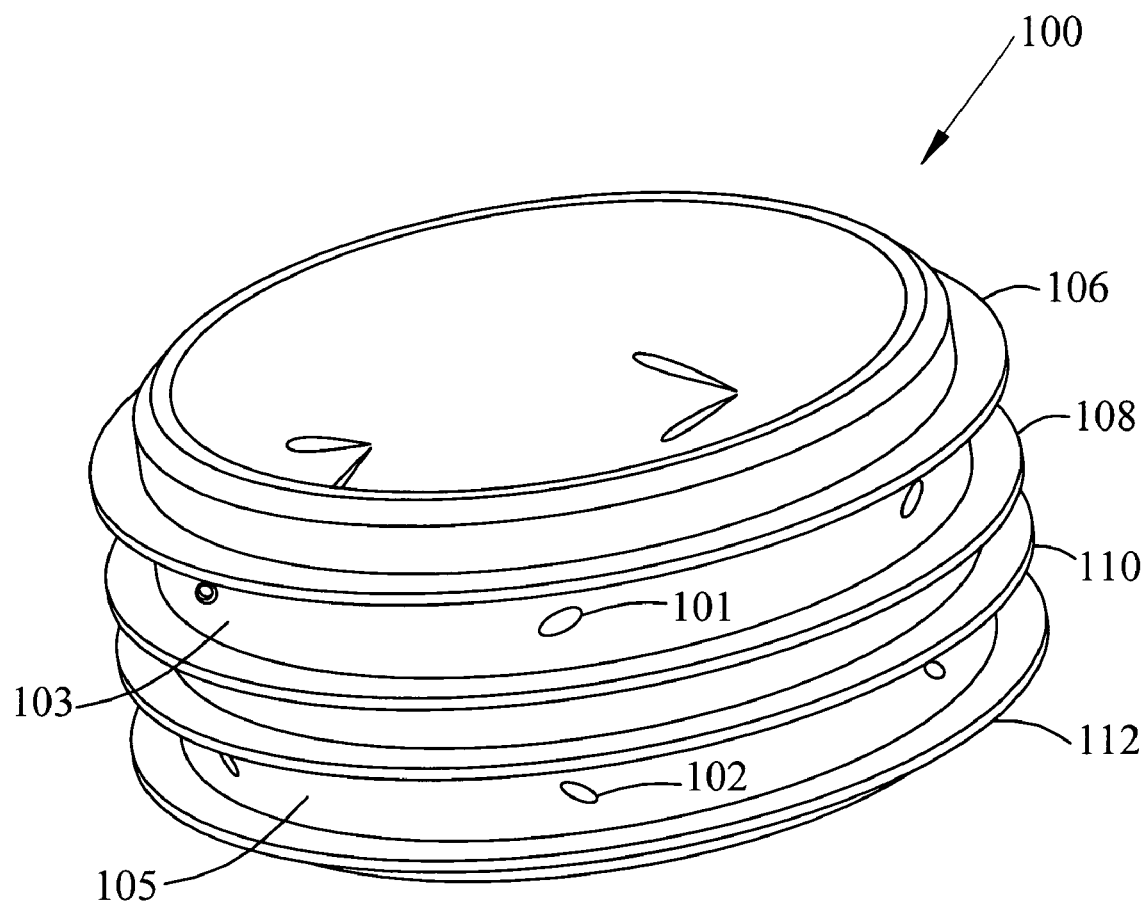
FIG. 1 is an isometric view of a vortex injector.

Referring now to the drawing wherein like numbers represent like parts in each of the several figures, FIG. 1 is a diagram of a vortex injector 100 with which the Sliding-Action Magneto-Mechanical Injector Throttling Device (SLAMMIT) may be used to improve the performance of the injector. The details of the structure and operation of such a vortex injector and its components such as fuel manifold 103, oxidizer manifold 105, representative fuel and oxidizer orifices 101 and 102, respectively, are found in U.S. Pat. No. 5,622,046, the disclosure text of which is fully incorporated herein by reference.

Figure 2:
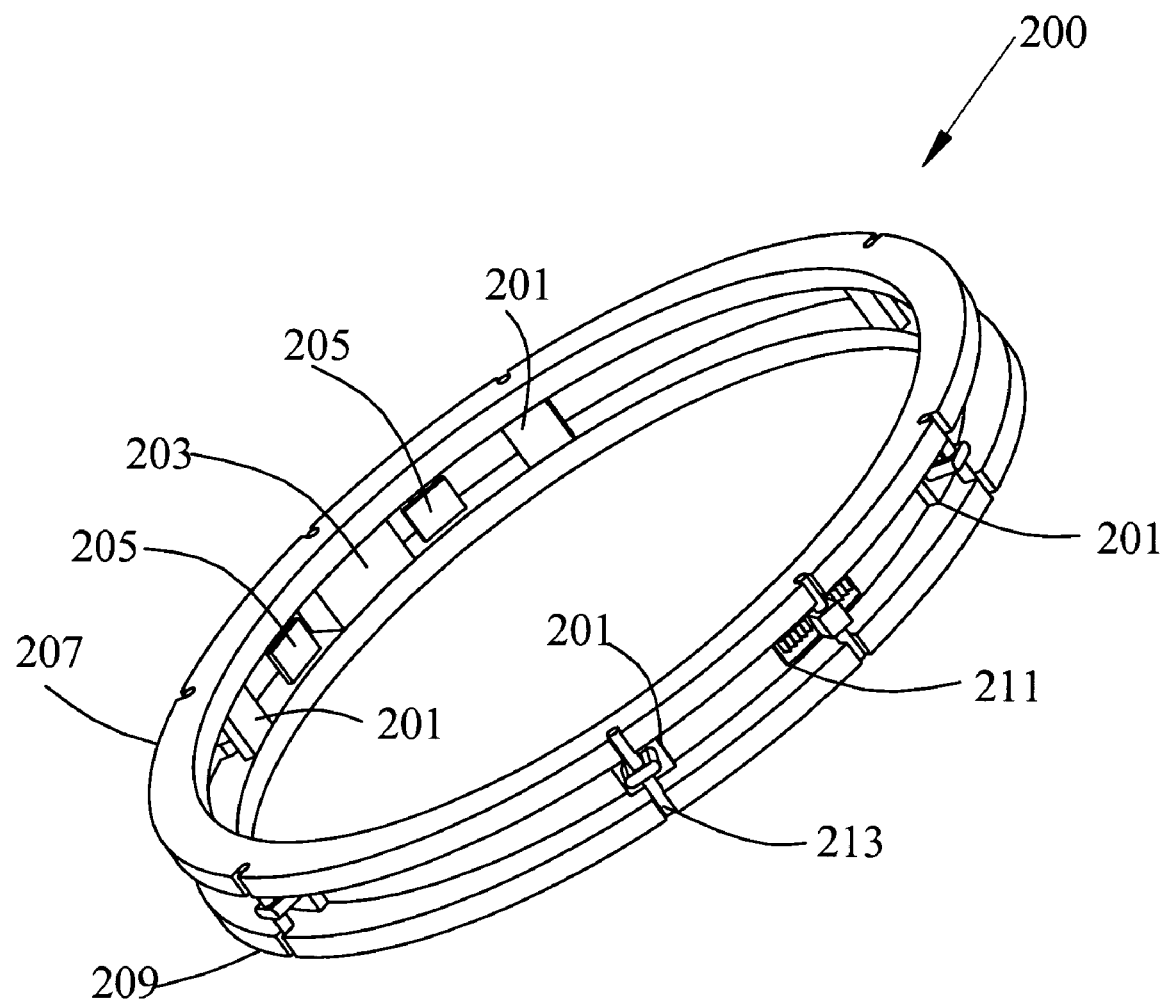
FIG. 2 illustrates a preferred embodiment of a SLAMMIT sub-assembly.
Figure 3:
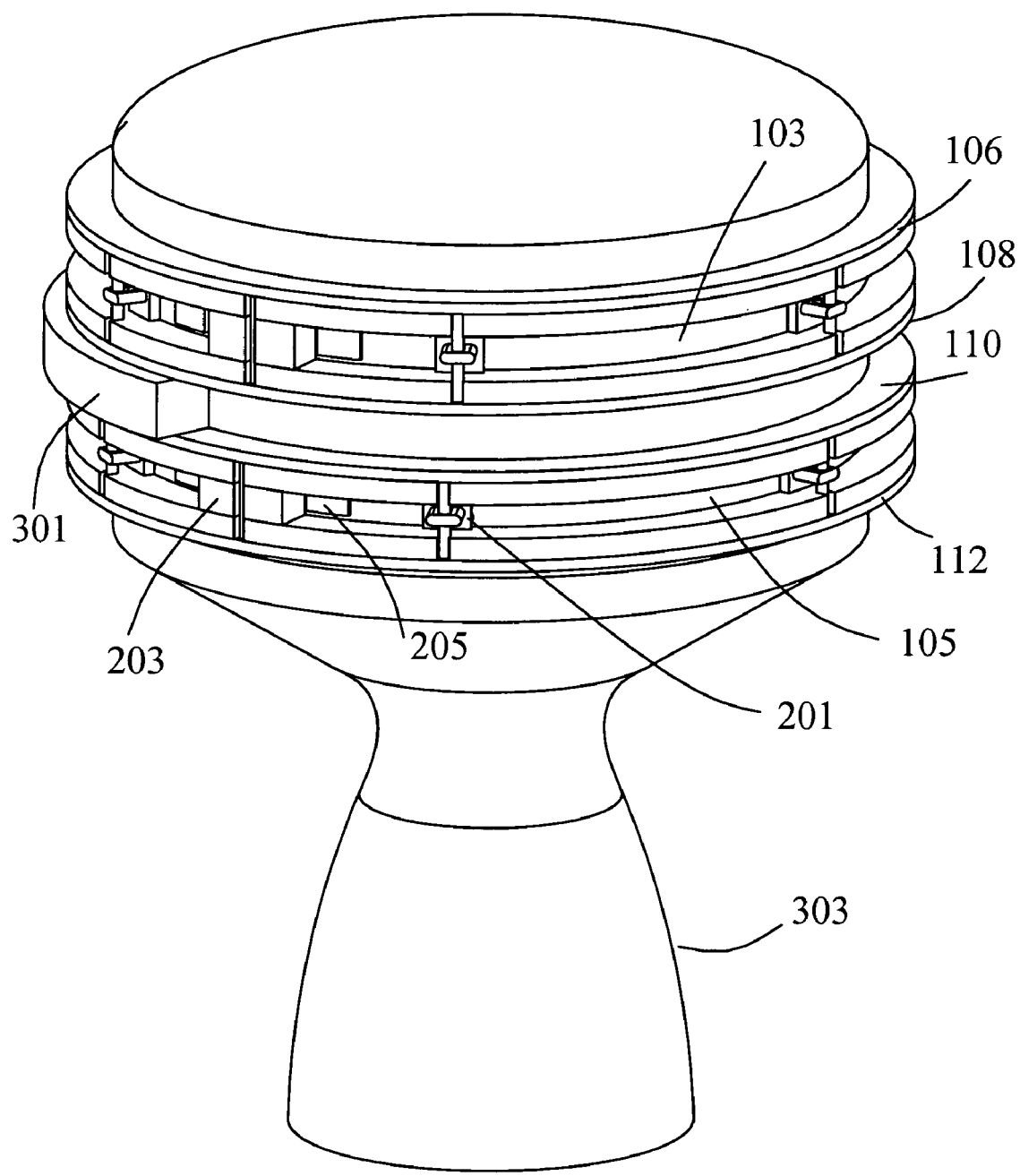
FIG. 3 shows how two SLAMMIT sub-assemblies are structured together with an electromagnet to form the SLAMMIT Device and how the SLAMMIT Device is used with a vortex injector. The injection orifices are shown as completely closed.

FIG. 2 illustrates a preferred embodiment of a SLAMMIT sub-assembly. Two such sub-assemblies along with electromagnet 301 between them comprise the SLAMMIT Device as depicted in FIG. 3 that also depicts nozzle throat 303 of the vortex thruster in which vortex injector 100 is employed.

As shown in FIG. 2, SLAMMIT sub-assembly 200 is comprised of first slide-guide ring 207 and second slide-guide ring 209 which, when put together with a manifold such as fuel manifold 103, are mounted on top and bottom of the manifold, respectively. If the manifold has first top overhang 106 and first bottom overhang 108, the first slide-guide ring is mounted under the first top overhang and the second slide-guide ring is mounted over the first bottom overhang. Such an integration configuration renders the implementation of SLAMMIT Device easy for pre-existing vortex injectors and can be used for both fuel manifold 103 and oxidizer manifold 105 as is illustrated in FIG. 3. When properly coupled with the manifold, depending on how the manifold itself is shaped, the slide-guide rings are constrained axially by the manifold but are free to rotate laterally about the outer perimeter of the injector body to which the manifold itself is coupled.

Between the two slide-guide rings and attached to the rings so as to move with the rings are a plurality of flappers 201 which match in number the injection orifices that communicate with the particular manifold on which the rings are mounted. Each flapper is paired with an orifice whose opening size it controls by completely covering it or completely leaving it open or anywhere in between. Each flapper, therefore, is of a shape and size suitable to close its corresponding orifice completely. The amount of flapper coverage of its corresponding orifice is controlled by the direction (i.e. left or right) and angle of rotation (i.e. how far in a given direction) of the slide-guide rings to which the flappers are attached. The rotation angle, in turn, is controlled by magnetic drive block 203 that translates inputs from activated electromagnet 301 into either positive or negative rotational motion for the rings. The direction of the rotational motion is determined by the polarity of the electromagnetic input while the angle of rotation is dictated by the strength of the magnetic field. One electromagnet, located between first bottom overhang 108 and second top overhang 110 can control two SLAMMIT sub-assemblies that make up a SLAMMET Device, as illustrated in FIG. 3.

Figure 4:
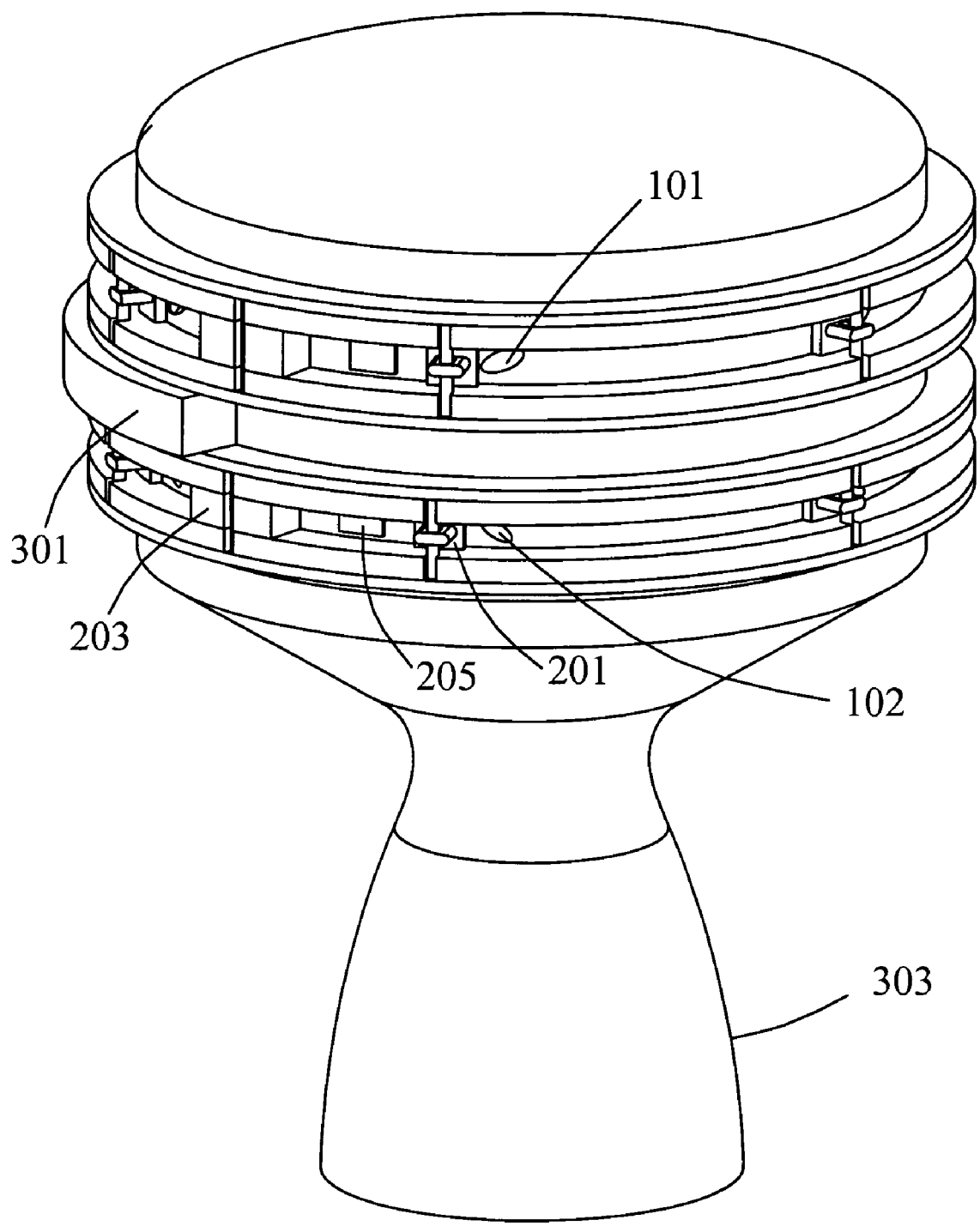
FIG. 4 illustrates a use of the SLAMMIT Device with the injection orifices completely open.

SLAMMIT sub-assembly 200 is also comprised of a pair of stop pads 205 that are fixedly attached to the exterior of injector body, one pad positioned on either side of magnetic drive block 203. The function of the stop pads is to put a hard stop to the rotation of slide-guide rings 207 and 209, therefore flappers 201, and prevent them from endless rotation when the SLAMMIT Device lacks a means for positional feedback. The stop pads prevent the flappers from controlling the opening size of more than one corresponding orifice. The flappers are prevented by the pads from overrunning the maximum and minimum (i.e. completely open/ completely closed) positions relative to their corresponding orifices. The completely open and completely closed positions of the orifices are depicted in FIGS. 4 and 3, respectively.

Figure 5:
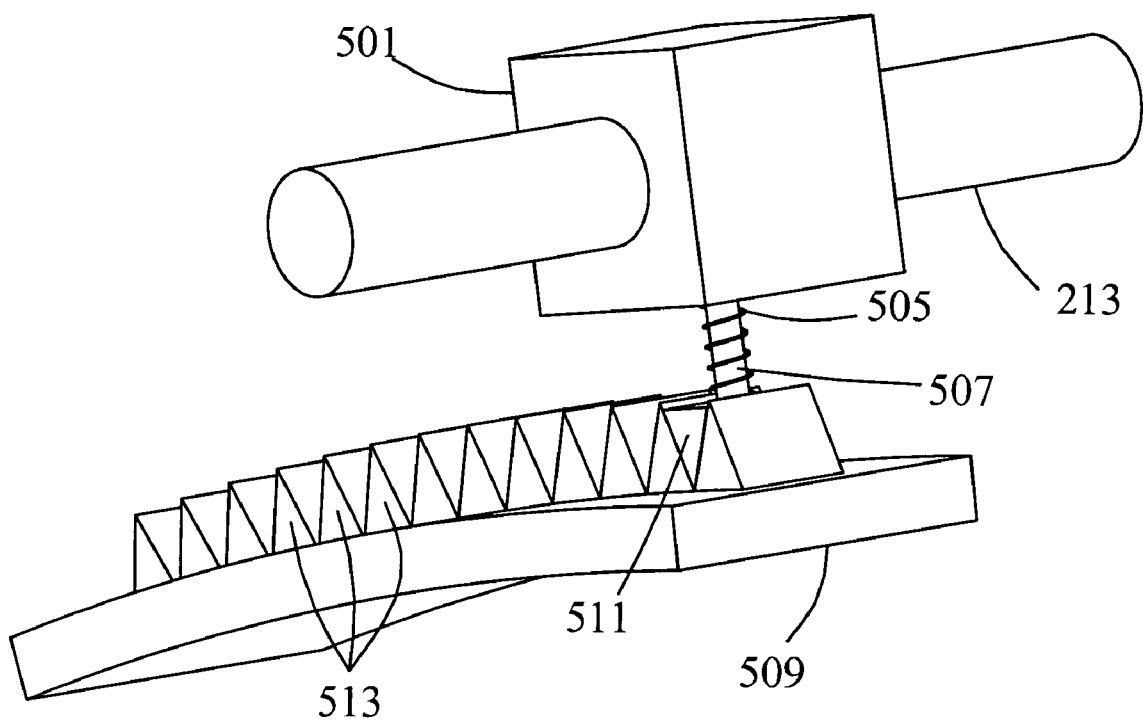
FIG. 5 gives a detailed view of a representative latching and releasing mechanism.

Several attachment rods 213, distributed along the perimeter of the slide-guide rings, provide a means to hold the two slide-guide rings in a pair together so as to enable them to slide in unison. Further, several latching and releasing mechanisms 211, of which attachment rods are a part, lock-in the instantaneous positions of the flappers upon deactivation of electromagnet 301 and subsequently release the flappers from their positions upon reactivation of the electromagnet. Such latching and releasing mechanisms can be of any configuration that is capable of achieving the stated purpose. A viable configuration of a representative latching and releasing mechanism is illustrated in detail in FIG. 5. As shown, the mechanism has base 509 that is fixedly attached to the injector body, a row of uniformly-shaped base teeth 513 extending from the base and mating tooth 511 shaped to fit into the groove between any two adjacent base teeth. The mating tooth is attached to magnetic shaft 507 which is retractably coupled to housing 501 and which is nestled inside spring 505. Attachment rod 213 passes through the housing and is of a length sufficient to anchor the housing to the slide-guide rings of a manifold while also holding the rings together. A little notch can be formed on the rings to accommodate and secure the rod in place.

When electromagnet 301 is deactivated, spring 505, under its own inherent force, maintains the shaft in the extended position (i.e. in a groove between two adjacent base teeth) thereby locking flappers in position. However, when electromagnet 301 is activated, the magnetic force between the electromagnet and the magnetic shaft is greater than the force applied by spring 505, causing the shaft to be repulsed and retract into the housing. This results in the mating tooth being lifted away from the groove, breaking the coupling of the SLAMMIT from the injector body and allowing the Device to move freely again until the flappers reach the next desired position and the electromagnet is once again deactivated.

SLAMMIT is a device to enhance the vortex injector's performance and as such affords a means for high efficiency throttling of the fuel and oxidizer mass flow into the combustor chamber without the use of conventional actuation techniques that require robust seals.

Figure 6:
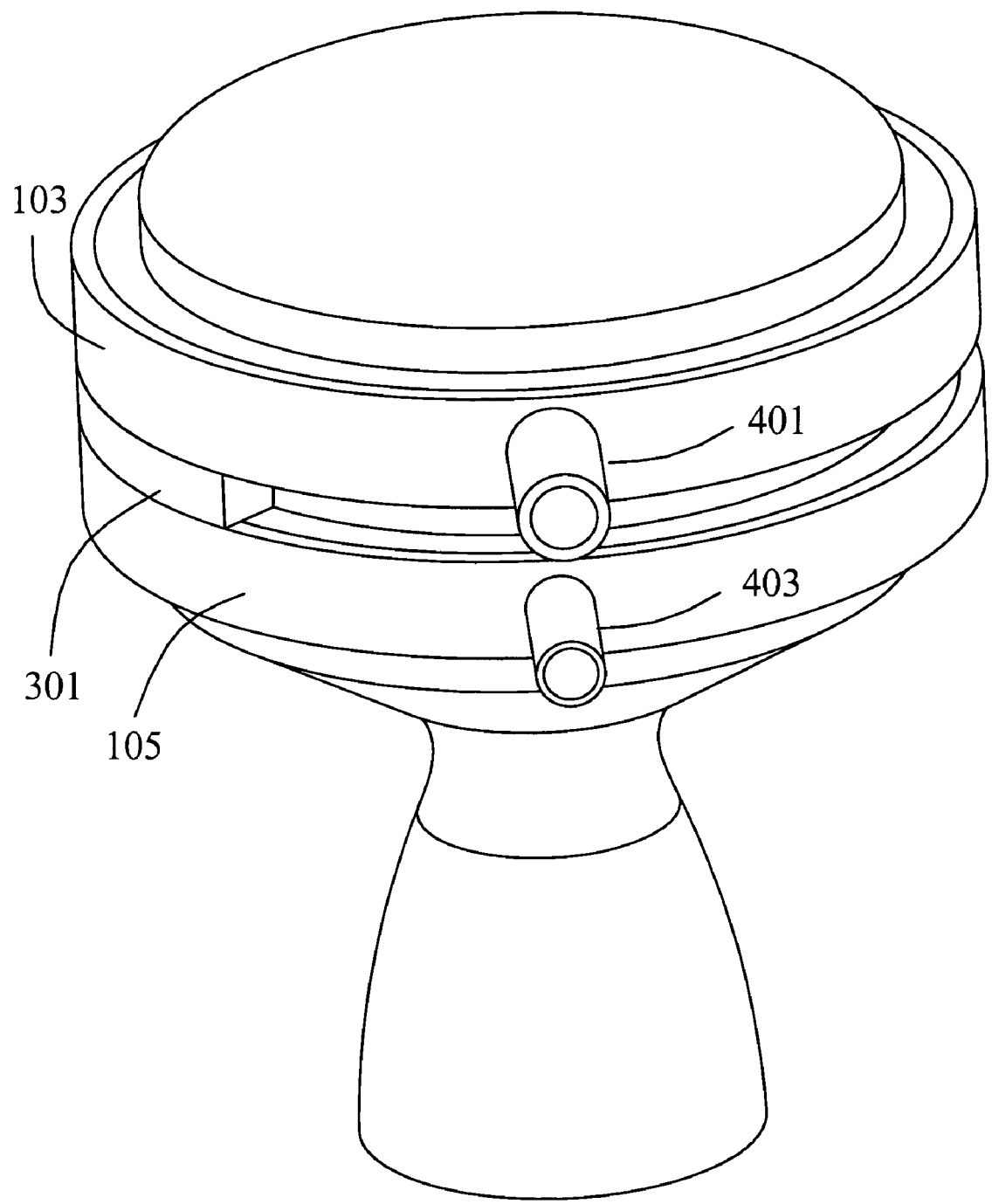
FIG. 6 is an isometric view of a vortex injector with fuel and oxidizer supply tubes and an integrated SLAMMIT Device where each sub-assembly has a protective covering.

FIG. 6 is a view of a vortex injector enhanced with a SLAMMIT Device having a protective covering over each sub-assembly and showing the positions of fuel supply tube 401 and oxidizer supply tube 403.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. Sliding-Action Magneto-Mechanical Injector Throttling Device in combination with a vortex injector, the injector comprising a body; a combustion chamber within the body, the body having a plurality of injection orifices leading to the chamber; a fuel manifold and an oxidizer manifold, the manifolds being coupled to the body and each having a top and a bottom, the manifolds further communicating with the orifices of the chamber so as to be able to input a fuel and an oxidizer, respectively, to the chamber through the orifices, said Throttling Device comprising: a first means for controlling the mass flow of the input fuel, said first controlling means being coupled to said fuel manifold; and a second means for controlling the mass flow of the input oxidizer, said second controlling means being coupled to said oxidizer manifold, both of said controlling means selectively varying the effective sizes of the injection orifices to provide a high-efficiency throttling of the fuel and oxidizer flow into the combustion chamber so as to produce power output of a desired level.

2. A Throttling Device in combination with a vortex injector as set forth in claim 1, wherein said first and second controlling means are similar in structure and each comprises: a top slide-guide ring mounted on said top of a manifold; a bottom slide-guide ring mounted on said bottom of the same manifold; a plurality of flappers designed to cover said injection orifices, said flappers being positioned between said slide-guide rings and mounted to move with said rings; and a means for sliding said guide rings by variable degrees so as to cause said flappers selectively to cover said orifices completely or open said orifices at least partially to achieve a pre-determined opening size of said orifices.

3. A Throttling Device in combination with a vortex injector as set forth in claim 2, wherein the total number of said flappers of said first and second controlling means equals the number of said injection orifices of said combustion chamber, each flapper being of a shape and size to enable said flapper to cover a corresponding orifice completely.

4. A Throttling Device in combination with a vortex injector as set forth in claim 3, wherein said sliding means of each controlling means comprises: an electromagnet; and a magnetic drive block, said block being affixed between said top and bottom slide-guide rings and further positioned to respond to said electromagnet, said block driving said rings in a given direction in response to the polarity of said electromagnet.

5. A Throttling Device in combination with a vortex injector as set forth in claim 4, wherein said electromagnet is located between said first and second controlling means such that said electromagnet influences the mass flow of both fuel and oxidizer from the fuel manifold and the oxidizer manifold, respectively, into the combustion chamber.

6. A Throttling Device in combination with a vortex injector as set forth in claim 5, wherein each of said controlling means further comprises: a pair of stop pads, one pad on either side of said drive block, said pads preventing said rings from sliding the entire distance between any two laterally adjacent orifices, thereby preventing any given flapper from controlling the opening size of more than one corresponding orifice.

7. A Throttling Device in combination with a vortex injector as set forth in claim 6, wherein said controlling means still further comprises a plurality of latching and releasing means distributed along the outer perimeter of said injector body, said latching and releasing means holding said slide-guide rings together so that they slide in unison, and cooperating with said electromagnet to fix said flappers in position from time to time.

8. A Throttling Device in combination with a vortex injector as set forth in claim 7, wherein said several latching and releasing means are alike in structure and each such means comprises: a base fixedly attached to said injector body; a housing anchored to said slide-guide rings; a means for anchoring said housing to said slide-guide rings; and a means for selectively engaging said housing with said base so as to lock said flappers in their respective instantaneous positions upon occasional de-activation of said electromagnet.

9. A Throttling Device in combination with a vortex injector as set forth in claim 8, wherein said anchoring means comprises: a rod passing vertically through said housing, said rod being of a sufficient length to reach and couple with said slide-guide rings.

10. A Throttling Device in combination with a vortex injector as set forth in claim 9, wherein said selectively engaging means comprises: several identical base teeth protruding from said base, any two adjacent base teeth Conning a cavity therebetween; a magnetic shaft having a tip, said shaft being retractably mounted onto said housing; a mating tooth coupled to said tip of said shaft, said mating tooth being shaped to fit into said cavity between any two adjacent base teeth; a means for selectively retracting or extending said shaft into or from said housing.

11. A Throttling Device in combination with a vortex injector as set forth in claim 10, wherein said retracting or extending means is a spring coupled to and surrounding the length of said shaft, said spring responding to said electromagnet to extend said shaft so as to insert said mating tooth into said cavity, thereby achieving the locking of flapper positions, said extension of said shaft coinciding with the occasional de-activation of said electromagnet.

12. In a vortex injector having a body; a combustion chamber within the body, the body having a plurality of injection orifices leading to the chamber; a fuel manifold and an oxidizer manifold, the manifolds being mounted onto the body and each having a top and a bottom surfaces and communicating with the orifices of the chamber so as to input a fuel and an oxidizer, respectively, to the chamber through the orifices, an improvement comprising a Sliding-Action Magneto-Mechanical Injector Throttling Device for varying the effective sizes of the injection orifices so as to allow the passage therethrough of pre-selected volumes of the input fuel and input oxidizer and produce power output of a desired level, said comprising: a paired first and second slide-guide rings, said first ring being mounted on the top surface of the fuel manifold; and said second ring being mounted on the bottom surface of the fuel manifold; a paired third and fourth slide-guide rings, said third ring being mounted on the top surface of the oxidizer manifold and said fourth ring being mounted on the bottom surface of the oxidizer manifold; a plurality of flappers designed to cover the injection orifices on the injector body, said flappers being positioned between said first and second slide-guide rings and between said third and fourth slide-guide rings and mounted to move with their respective paired rings; and a means for sliding said paired guide rings by variable degrees so as to cause said flappers to cover said orifices at least partially to achieve a pre-determined variable opening size of said orifices.

13. A Throttling Device Improvement for said vortex injector as set forth in claim 12, wherein the total number of said flappers equals the number of said injection orifices on the injector body, and said sliding means comprises: an electromagnet positioned between said fuel and oxidizer manifolds; and two magnetic drive blocks, one of said blocks being affixed between said top and bottom slide-guide rings of each paired rings and further positioned to move said paired rings in a given direction in response to the polarity of said electromagnet.

14. A Throttling Device Improvement for said vortex injector as set forth in claim 13, wherein said device further comprises: a pair of stop pads positioned between said top and bottom slide-guide rings of each paired rings, one pad on either side of said drive block, said pads preventing said paired rings from sliding the entire distance between any two laterally adjacent orifices, thereby preventing any given flapper from controlling the opening size of more than one orifice.

15. A Throttling Device Improvement for said vortex injector as set forth in claim 14, wherein said device still further comprises a plurality of latching and releasing means distributed along the outer perimeter of said injector body, said latching and releasing means cooperating with said electromagnet to lock said flappers in position from time to time.

16. A Throttling Device Improvement for said vortex injector as set forth in claim 15, wherein said several latching and releasing means are alike in structure and each such means comprises: a base fixedly attached to said injector body; a housing anchored to said slide-guide rings; a means for anchoring said housing to said slide-guide rings; and a means for selectively engaging said housing with said base so as to lock said flappers in their respective instantaneous positions upon occasional de-activation of said electromagnet.

17. A Throttling Device Improvement for said vortex injector as set forth in claim 16, wherein said anchoring means comprises: a rod passing vertically through said housing and being of a sufficient length to reach and couple with said slide-guide rings.

18. A Throttling Device Improvement for said vortex injector as set forth in claim 17, wherein said selectively engaging means comprises: several identical base teeth protruding from said base, any two adjacent base teeth forming a cavity therebetween; a magnetic shaft having a tip, said shaft being retractably mounted onto said housing; a mating tooth coupled to said tip of said shaft, said mating tooth being shaped to fit into said cavity between any two adjacent base teeth; and a means for selectively retracting or extending said shaft into or from said housing.

* * * * *